United States Patent
Sinha et al.

(10) Patent No.: US 10,794,865 B2
(45) Date of Patent: Oct. 6, 2020

(54) ULTRASONIC IN-SITU WATER-CUT MEASUREMENT USING ULTRASONIC OIL-WATER SEPARATION FOR AFFECTING SOUND SPEED CALIBRATION

(71) Applicant: Triad National Security, LLC, Los Alamos, NM (US)

(72) Inventors: Dipen N. Sinha, Los Alamos, NM (US); Cristian Pantea, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 234 days.

(21) Appl. No.: 15/563,603

(22) PCT Filed: Apr. 1, 2016

(86) PCT No.: PCT/US2016/025693
§ 371 (c)(1),
(2) Date: Oct. 1, 2017

(87) PCT Pub. No.: WO2016/161358
PCT Pub. Date: Oct. 6, 2016

(65) Prior Publication Data
US 2018/0088083 A1   Mar. 29, 2018

Related U.S. Application Data

(60) Provisional application No. 62/141,531, filed on Apr. 1, 2015.

(51) Int. Cl.
*G01N 29/024* (2006.01)
*G01F 1/74* (2006.01)

(52) U.S. Cl.
CPC ............. *G01N 29/024* (2013.01); *G01F 1/74* (2013.01); *G01N 2291/0222* (2013.01);
(Continued)

(58) Field of Classification Search
CPC ................................ G01N 29/024; G01F 1/74
(Continued)

(56) References Cited

U.S. PATENT DOCUMENTS

| 4,836,026 A * | 6/1989 | P'an ...................... G01S 7/5205 73/606 |
| 6,874,361 B1 * | 4/2005 | Meltz ...................... E21B 43/14 73/152.32 |
| 2009/0264768 A1 * | 10/2009 | Courtney ............. A61B 5/0062 600/463 |

* cited by examiner

*Primary Examiner* — John Fitzgerald
*Assistant Examiner* — Rodney T Frank
(74) *Attorney, Agent, or Firm* — Alston & Bird LLP

(57) ABSTRACT

An apparatus and method for the separation of an oil-water mixture into its components are described. An acoustic radiation force moves oil droplets to the nodes of an acoustic standing wave generated in a vertical column containing the oil-water mixture. Once the droplets are sufficiently close together, attractive forces become dominant and the droplets may coalesce to form larger droplets, which have greater buoyancy, and separation of the mixture into a layer of oil and a layer of water occurs, not possible by simple gravitational separation. Acoustically-driven oil-water separation may be used for water-cut measurements in oil production wells, since separation of the oil from the water permits accurate sound speed measurements to be made for both the oil and the water, thereby allowing frequent in situ calibrations of the apparatus to determine whether sound speed measurements on the mixture are accurate in the event that one or both of the mixture constituents is changing.

21 Claims, 5 Drawing Sheets

(52) U.S. Cl.
CPC ............... *G01N 2291/0226* (2013.01); *G01N 2291/105* (2013.01); *G01N 2291/2634* (2013.01)

(58) Field of Classification Search
USPC ........................................................ 73/61.45
See application file for complete search history.

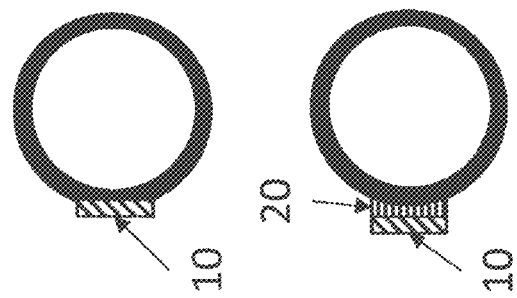
FIG.1d
FIG.1e
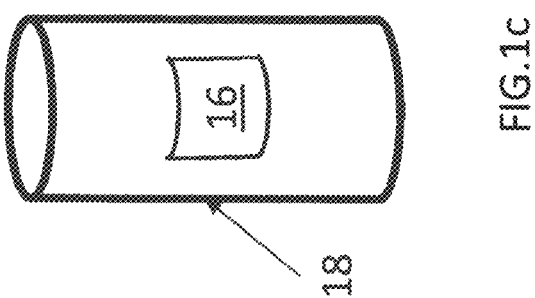
FIG.1c
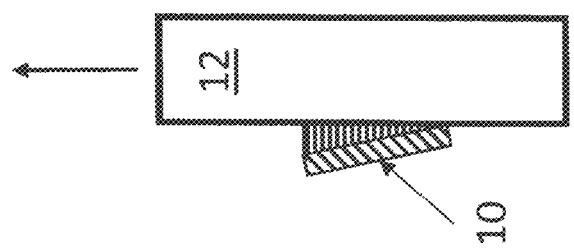
FIG.1b
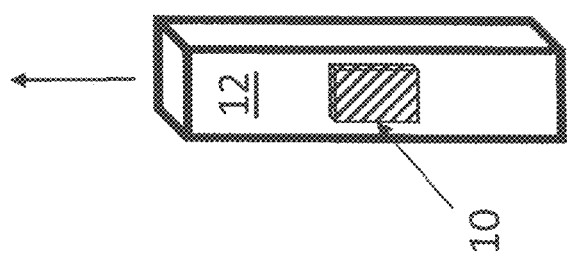
FIG.1a

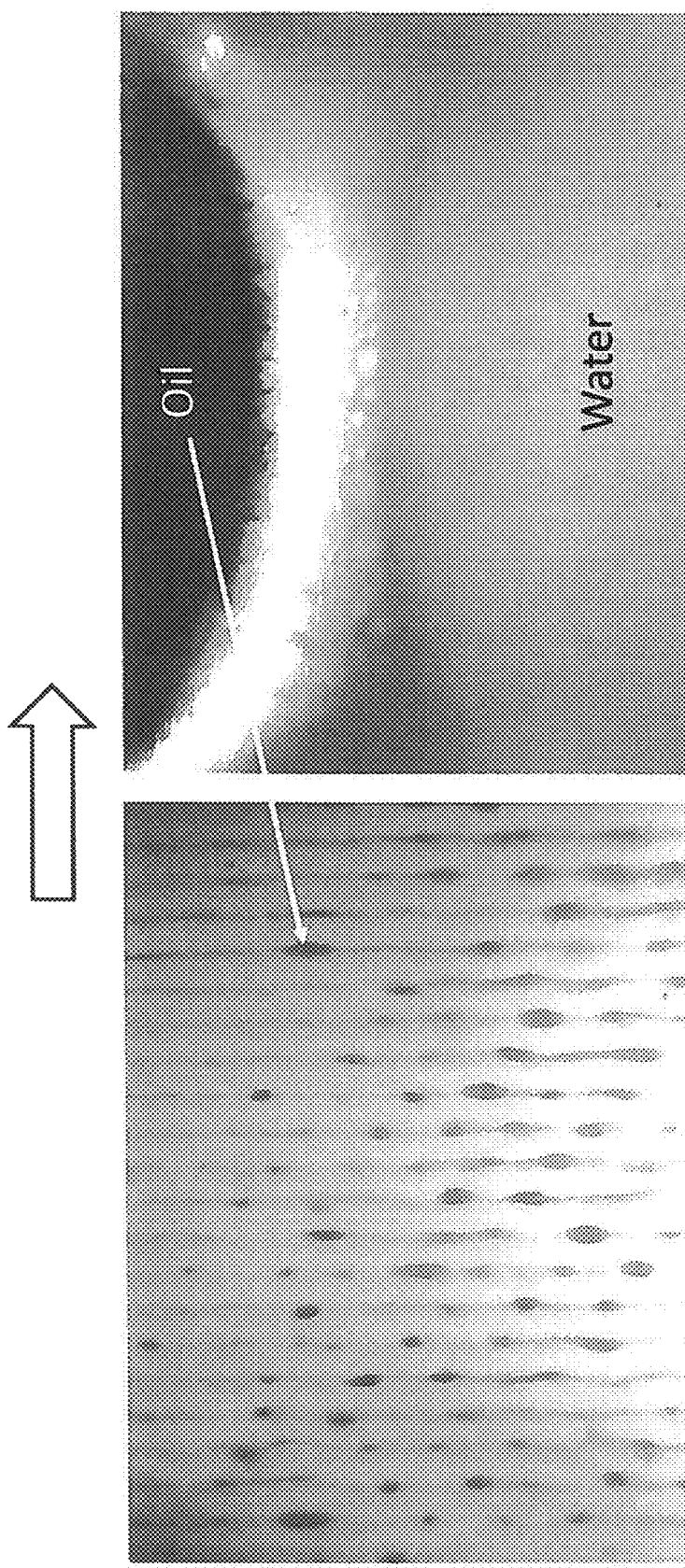

ULTRASONIC IN-SITU WATER-CUT MEASUREMENT USING ULTRASONIC OIL-WATER SEPARATION FOR AFFECTING SOUND SPEED CALIBRATION

CROSS-REFERENCE TO RELATED APPLICATIONS

The present application claims the benefit of PCT Patent Application Number PCT/US2016/025693 for "Ultrasonic In-Situ Water-Cut Measurement Using Ultrasonic Oil-Water Separation For Affecting Sound Speed Calculation," by Dipen N. Sinha et al., which was filed on Apr. 1, 2016, and U.S. Provisional Patent Application No. 62/141,531 for "Ultrasonic In-Situ Water-Cut Measurement Using Ultrasonic Oil-Water Separation For Affecting Sound Speed Calculation," by Dipen N. Sinha et al., which was filed on Apr. 1, 2015, the contents of which these applications are hereby specifically incorporated by reference herein for all that they disclose and teach.

STATEMENT REGARDING FEDERAL RIGHTS

This invention was made with government support under Contract No. DE-AC52-06NA25396 awarded by the U.S. Department of Energy. The government has certain rights in the invention.

BACKGROUND

Water concentration (water-cut value) in produced oil may be determined from measurement of sound speed in oil-water mixtures using ultrasonic-based water-cut measurement devices. For accurate water-cut measurements, a sample of the oil is centrifuged and separated into two primary components: oil and water. Sound speed in each of these components is measured over the temperature range of operation of the well. From this sound speed data for each component, a calibration is produced based on a mixture equation (e.g., Urick or other models) that allows the determination of water-cut from the sound speed of the oil-water mixture from the oil well. Continued production depletes oil wells in terms of oil production over time and this affects the characteristics of the produced fluid. As an example, surfactants are often used to separate the oil from the water, and/or the salt concentration, mineral concentrations, and pH of the water may change over time. In addition, the mineral content of the produced water may vary over time affecting its sound speed. This can introduce error in the water-cut measurement unless a new calibration is obtained. For high water-cuts (large fraction of water in the oil-water mixture), the produced water determines the accuracy of the water-cut measurement; therefore, it is important to monitor the water sound speed more often to determine if the value has changed beyond a certain limit before a new calibration is warranted. One approach is to obtain a sample of the produced fluid using an isokinetic sampler or other sampling mechanisms. The fluid is then spun in a centrifuge to separate the oil from the water, after which the sound speed measured. This procedure is time consuming, expensive and not real-time and, if a large number of wells are involved, the calibration processes can become onerous and significantly add to the overall production cost.

Another approach was recently described where water is gravitationally separated from oil for an ultrasonic sound speed measurement. However, gravitational separation often does not completely separate the oil from the water and fine droplets of one phase may remain in the other phase, which may adversely affect the accuracy of the sound speed measurement for calibration purposes.

SUMMARY

Embodiments of the present invention overcome the disadvantages and limitations of the prior art by providing an apparatus and method for measuring water-cut in an oil-water mixture.

Another object of embodiments of the present invention is to provide an apparatus and method for measuring water-cut in an oil/water mixture without sampling.

Yet another object of embodiments of the present invention is to provide a non-invasive, in-situ apparatus and method for measuring water-cut in an oil-water mixture without sampling.

Still another object of embodiments of the present invention is to provide an apparatus and method for removing trace amounts of oil from the water in an oil-water mixture.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the objects and purposes of embodiments of the present invention, as embodied and broadly described herein, the apparatus for measuring the water-cut in an oil-water mixture, hereof includes: a length of vertically oriented pipe through which the oil-water mixture flows in an upward direction, the length of pipe having an outer surface; a valve disposed in a lower portion of the length of pipe for stopping the flow of the oil-water mixture and isolating a chosen volume of the oil-water mixture, when closed, and for permitting the oil-water mixture to flow through the length of pipe, when open; at least one first ultrasound transmitting transducer disposed on the outer surface of the length of pipe downstream of the valve; a signal generator for driving the at least one first transmitting transducer with a selected frequency pattern such that an acoustic radiation force is generated having sufficient intensity such that oil droplets in the non-flowing oil-water mixture are driven toward nodal features of the radiation force, whereby the oil separates from the water in the oil-water mixture; a second ultrasonic transmitting transducer disposed on the outer surface of the length of pipe upstream or downstream from the first transmitting transducer; a first pulse generator for providing pulsed excitation to the second transmitting transducer, whereby a first acoustic pulse is generated by the second transmitting transducer; a first detecting transducer disposed on the surface of the length of pipe on the opposite side of the length of pipe from the second transmitting transducer for receiving acoustic pulses from the second transmitting transducer; a first measurement apparatus for receiving electrical signals from the first detecting transducer produced on receipt thereby of an acoustic pulse from the second transmitting transducer, whereby the speed of sound is measured from the time-of-flight of the first pulse in the separated water portion of the non-flowing oil-water mixture, or in the flowing oil-water mixture in the length of pipe; a third ultrasonic transmitting transducer disposed on the surface of the pipe section downstream from the second transmitting transducer; a second pulse generator for providing pulsed excitation to the third transmitting transducer, whereby a second acoustic pulse is generated by the third transmitting transducer; a second detecting transducer disposed on the surface of the section of pipe on the opposite side of the length of pipe from the third transmitting transducer, for receiving acoustic pulses from the third transmitting transducer; and a second measurement apparatus receiving electrical signals from the second detecting transducer produced on receipt thereby of an acoustic pulse from the third transmitting transducer, whereby the speed of sound is measured from the time-of-flight of the second acoustic pulse in the separated oil portion of the non-flowing oil-water mixture, or in the flowing oil-water mixture in the length of pipe.

In another aspect of embodiments of the present invention, and in accordance with their objects and purposes, the method for measuring the water-cut in an oil-water mixture, hereof includes: measuring the time-of-flight of an acoustic pulse in the oil-water mixture flowing in an upward direction through a vertically oriented section of pipe; stopping the flow of the oil-water mixture through the vertically oriented section of pipe; generating an acoustic standing wave pattern in the non-flowing oil-water mixture in the vertically oriented section of pipe having sufficient intensity that oil droplets are moved to the nodes thereof by the acoustic radiation force thereby produced, whereby the oil and water are separated from the non-flowing oil-water mixture; directing a first ultrasonic pulse through the water portion produced in said step of generating an acoustic standing wave; measuring the time of flight of the first acoustic pulse through the water, whereby the speed of sound in the water is determined; directing a second ultrasonic pulse through the oil portion produced in the step of generating an acoustic standing wave downstream from the first ultrasonic pulse; and measuring the time of flight of the second acoustic pulse, whereby the speed of sound in the oil is determined.

In yet another aspect of embodiments of the present invention, and in accordance with their objects and purposes, the apparatus for measuring the water-cut in an oil-water mixture, hereof includes: a length of vertically oriented pipe through which the oil-water mixture flows in an upward direction, the length of pipe having an outer surface; a valve disposed in a lower portion of the length of pipe for stopping the flow of the oil-water mixture and isolating a chosen volume of the oil-water mixture, when closed, and for permitting said oil-water mixture to flow through the length of pipe, when open; at least one first ultrasound transmitting transducer disposed on the outer surface of the length of pipe downstream of the valve; a signal generator for driving the at least one first transmitting transducer with a selected frequency pattern such that an acoustic radiation force is generated having sufficient intensity such that oil droplets in the non-flowing oil-water mixture are driven toward nodal features of the radiation force, whereby the oil separates from the water in the oil-water mixture; a second ultrasonic transmitting transducer disposed on the outer surface of the section of pipe upstream or downstream from the first transmitting transducer; a first pulse generator for providing pulsed excitation to the second transmitting transducer, whereby a first acoustic pulse is generated by the second transmitting transducer; a first detecting transducer disposed on the surface of the section of pipe on the opposite side of the section of pipe from the second transmitting transducer for receiving acoustic pulses from the second transmitting transducer; and a first measurement apparatus for receiving electrical signals from the first detecting transducer produced on receipt thereby of an acoustic pulse from the second transmitting transducer, whereby the speed of sound is measured from the time-of-flight of the first pulse in the separated water portion of the non-flowing oil-water mixture, or in the flowing oil-water mixture in the section of pipe.

In still another aspect of embodiments of the present invention, and in accordance with their objects and purposes, the method for measuring the water-cut in an oil-water mixture, hereof includes: measuring the time-of-flight of an acoustic pulse in the oil-water mixture flowing in an upward direction through a vertically oriented section of pipe; stopping the flow of the oil-water mixture through the vertically oriented section of pipe; generating an acoustic standing wave pattern in the non-flowing oil-water mixture in the vertically oriented section of pipe having sufficient intensity that oil droplets are moved to the nodes thereof by the acoustic radiation force thereby produced, whereby the oil and water are separated from the non-flowing oil-water mixture; directing a first ultrasonic pulse through the water portion produced in the step of generating an acoustic standing wave; and measuring the time of flight of the first acoustic pulse through the water, whereby the speed of sound in the water is determined.

In another aspect of embodiments of the present invention, and in accordance with their objects and purposes, the apparatus for measuring the water-cut in an oil-water mixture, hereof includes: a length of vertically oriented pipe through which the oil-water mixture flows in an upward direction, the length of pipe having an outer surface; a valve disposed in a lower portion of the length of pipe for stopping the flow of the oil-water mixture and isolating a chosen volume of the oil-water mixture, when closed, and for permitting the oil-water mixture to flow through the length of pipe, when open; at least one first ultrasound transmitting transducer disposed on the outer surface of the length of pipe downstream of the valve; a signal generator for driving the at least one first transmitting transducer with a selected frequency pattern such that an acoustic radiation force is generated having sufficient intensity such that oil droplets in the non-flowing oil-water mixture are driven toward nodal features of the radiation force, whereby the oil separates from the water in the oil-water mixture; a second ultrasonic transmitting transducer disposed on the outer surface of the length of pipe downstream from the first transmitting transducer; a first pulse generator for providing pulsed excitation to said second transmitting transducer, whereby a first acoustic pulse is generated by the second transmitting transducer; a first detecting transducer disposed on the surface of said length of pipe on the opposite side of the length of pipe from the second transmitting transducer for receiving acoustic pulses from the second transmitting transducer; and a first measurement apparatus for receiving electrical signals from the first detecting transducer produced on receipt thereby of an acoustic pulse from the second transmitting transducer, whereby the speed of sound is measured from the time-of-flight of the first pulse in the separated oil portion of the non-flowing oil-water mixture, or in the flowing oil-water mixture in the section of pipe.

In yet another aspect of embodiments of the present invention, and in accordance with their objects and purposes, the method for measuring the water-cut in an oil-water mixture, hereof includes: measuring the time-of-flight of an acoustic pulse in the oil-water mixture flowing in an upward direction through a vertically oriented section of pipe; stopping the flow of the oil-water mixture through the vertically oriented section of pipe; generating an acoustic standing wave pattern in the non-flowing oil-water mixture in the vertically oriented section of pipe having sufficient intensity that oil droplets are moved to the nodes thereof by the acoustic radiation force thereby produced, whereby the oil and water are separated from the non-flowing oil-water mixture; directing a first ultrasonic pulse through the oil portion produced in the step of generating an acoustic standing wave; and measuring the time of flight of the first acoustic pulse through the oil, whereby the speed of sound in the water is determined.

Benefits and advantages of embodiments of the present invention include, but are not limited to, providing an apparatus and method for separating oil-water mixtures produced in oil wells, which is useful for noninvasive, in-situ water-cut measurements for oil/water mixtures using sound speed, since variations in the sound speed for either or both of the water or oil constituents of the mixture, which affect the measurement for the mixture, can be determined without the necessity of fluid sampling.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIGS. 1A-1E are schematic representations of useful transducer-pipe configurations.

FIG. 5A is a photograph of micron-size oil droplets in an emulsion with no acoustic field present, while FIG. 5B is a photograph showing the coalescing of these droplets into millimeter-sized droplets at the acoustic standing wave patterns (nodes) generated in the liquid (1.345 MHz) when acoustic energy is applied to the fluid in an apparatus similar to that of FIG. 2 hereof.

FIG. 6A is a photograph of the further coalescing of the droplets illustrated in FIG. 5A hereof, while FIG. 6B shows the almost immediate gravitational separation resulting in the oil moving to the top of the water column when the acoustic filed is turned off.

DETAILED DESCRIPTION

Figure 2:
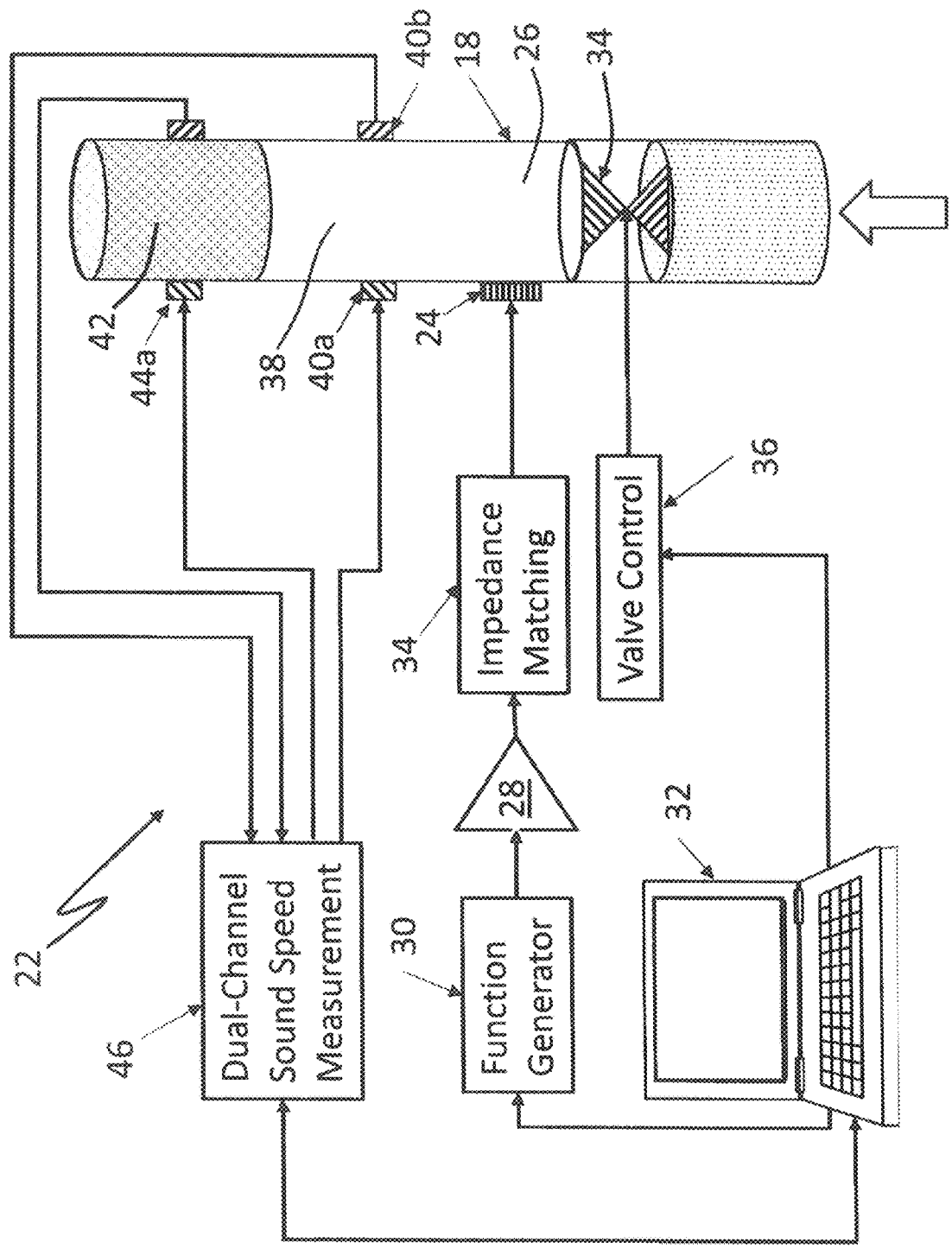
FIG. 2 is a schematic representation of an embodiment of an apparatus effective for oil-water separation and in-situ water-cut calibration.

Briefly, embodiments of the present invention include apparatus and method for separating small droplets of one fluid suspended in another fluid, for example, oil-water mixtures produced from a well, such that the water-cut of the oil-water mixture can accurately be measured. The in situ separation is based on the acoustic radiation force, which is a physical phenomenon resulting from the interaction of an acoustic wave with a particle such as an oil droplet in water along its path.

This approach permits the accuracy of the water-cut for the oil-water mixture flowing through a pipe to be checked on a frequent basis without the need for removing a fluid sample from the flow stream to evaluate the changes in the properties of its individual primary components: oil and process water. The present in-situ acoustic separation procedure not only separates the mixed fluid into water and oil so that sound speed in each component can be separately and accurately measured, but permits the accuracy of the calibration to be monitored over time. If the sound speed in each of the separated water and oil components is regularly measured, and the temperature is known, this information can be used to adjust the original calibration on a regular basis; that is, whenever the production pump ceases pumping. The same sensors (transducers) used for the calibration measurements may also be used for continuous water-cut measurement in the flowing fluid mixture.

Kaduchak and Sinha in U.S. Pat. No. 6,467,350, have shown that aerosols can be separated from air inside a cylindrical resonator cavity by tuning the cavity. Tuning was achieved by making the cylinder slightly elliptical. Another effective procedure was to cut a slit in the wall of the resonator. Embodiments of the present invention, by contrast, do not require such tuning, thereby significantly simplifying the present apparatus and method. Sinha, in U.S. Pat. No. 8,640,529, showed that the acoustic radiation force can be used to separate gas from an oil-water mixture in a flowing system, and Garcia-Lopez and Sinha have separated oil-water emulsions in a resonant acoustic cavity (See, "Enhanced Acoustic Separation of Oil-Water Emulsion in Resonant Cavities" by A. Garcia-Lopez et al., The Open Acoustics Journal, 2008, 1, pages 66-71.). Others have shown that by inserting steel wool into the pipe containing the oil-water mixture, oil droplets can be collected, and subsequently separated. By contrast, in accordance with the teachings of embodiments of the present invention, no intrusion into the pipe is required.

The acoustic force depends on the acoustic power, the frequency, the size of the droplet, the density and compressibility of the droplet and the host fluid, increasing with increasing frequency and increasing droplet size. Acoustic separation requires significantly higher power (several orders of magnitude) than the power levels used for swept frequency acoustic interferometry (SFAI) for sound speed measurements. If an acoustic standing wave is set up between two rigid boundaries also having a fluid mixture, such as an oil-water emulsion therebetween, the droplets of one fluid in the host fluid will tend to migrate towards the nodal features (pressure nodes or the antinodes) of the standing wave, due to the acoustic force these droplets experience. Thus, oil droplets may be moved to the nodes of an acoustic standing wave set up in a vertical column containing the oil-water mixture. Once the droplets are sufficiently close together, a secondary force, the attractive Bjerknes force, becomes dominant and the droplets may coalesce resulting in larger droplets. The larger droplets have greater buoyancy that assists these droplets in moving against gravitational forces, thereby separating from the host liquid. The force operates on fine droplets and emulsions, thus enabling oil to be removed from water to levels that are not possible with simple gravitational separation. It should be mentioned that buoyant forces are the cause for gravitational separation.

Although the concept of acoustic separation is known, most systems are designed for horizontal flows. The droplet coalescence followed by enhanced gravitational separation of oil from the water in a vertical pipe or container of embodiments of the present invention enables droplets of oil to be efficiently removed from the water and water droplets to be efficiently removed from the oil, once the flow of the oil-water mixture is stopped, and the mixture is exposed to an acoustic force, which is either generated perpendicular to the pipe axis or at an angle thereto.

As will be described in greater detail hereinbelow, acoustically-driven oil-water separation may be used for water-cut in situ calibration, since separation of the oil from the water permits an accurate sound speed measurement to be made for the individual components, such as process water, thereby allowing in situ calibration of the apparatus for water-cut measurements. As stated above, the use of an acoustic field significantly enhances gravitational oil separation from the water as well.

A typical rod-pumped oil well does not run continuously, but pauses while the well recharges. In-situ calibration is carried out during the interval when the pump is not running, requiring a process that can be fast and reliable, since there is generally insufficient time for gravitational separation to effectively take place. A section or length of pipe spool is placed vertically in the flow line through which the produced fluid flows from the pump. This section can either be prefabricated or attached to any existing pipe, the outside surface of the length of pipe being prepared such that transducers can be effectively attached. As soon as the pump comes to rest and there is no fluid coming from the well, a solenoid valve may be used to shut off the flow and isolate a volume of liquid to be tested.

The acoustic separation mentioned hereinabove may be implemented using piezoelectric transducers. A single transducer or multiple transducers may be placed around the circumference of a pipe (rectangular or circular cross-section) in acoustic contact with the surface thereof. The transducers may have different frequencies and be disposed vertically on the pipe. For example, a higher frequency transducer (or transducers) can be placed near the bottom of the pipe so that smaller droplets may coalesce and concentrate in an oil-water emulsion. As the oil droplets grow in size, they move upwards and enter into the field of lower frequency transducers, which more effectively cause coalescence of the larger droplets forming still larger droplets, producing a rapid separation of the oil from the water from the combination of gravitational forces with acoustic forces. Although separation of oil from water is stressed, embodiments of the present invention can be used for separations of any liquid-liquid mixtures.

Reference will now be made in detail to the present embodiments of the invention, examples of which are illustrated in the accompanying drawings. In the FIGURES, similar structure will be identified using identical reference characters. It will be understood that the FIGURES are presented for the purpose of describing particular embodiments of the invention and are not intended to limit the invention thereto. Turning now to FIG. 1, shown is a schematic representation of useful transducer-pipe configurations. In the simplest case, flat transducer, 10, is disposed on the surface of rectangular pipes, 12, as shown in FIG. 1A. Tilted wedge, 14, shown in FIG. 1B may be used to direct the sound field of transducer 10 at angle such that there is a component of force in the vertical direction, which speeds up the separation. Curved transducers, 16, may be attached to cylindrical pipes, 18, shown in FIG. 1C, where the curvature of the transducer matches that of the pipe. Flat transducer 10 may also be placed in contact with a curved surface of cylindrical pipe 18 if either a portion of the curved surface is flattened to accommodate the flat transducer, as illustrated in FIG. 1D, or a wedge (flat to curve) surface, 20, is used as a transition as shown in FIG. 1E.

Transducers are typically constructed from piezoelectric crystals; however, other methods for producing vibrations at desired frequencies may be used, the choice of the transducer type not being important. Many combinations of transducer excitation may be used to maximize the separation efficiency and optimize the required power.

FIG. 2 is a schematic representation of an embodiment of apparatus, 22, hereof. Acoustic Force Transducer (piezoelectric crystal—PZT4, as an example), 24, having a 2-in. diameter and a center frequency of 1 MHz, and placed in acoustic contact with the surface of pipe 18 was used for excitation of oil-water emulsions, 26, or other fluids contained in pipe 18. Transducer 24 was powered by ENI 2040 power amplifier, 28, driven by function generator, 30, controlled by computer 32. A CW sine wave or a tone burst may be employed, as examples, to generate the standing waves in the length of pipe. Impedance matching network, 34, may be used to maximize the power transferred to transducer 24 by reducing reflections from the transducer. The power used was between about 40 W and approximately 100 W.

Calibration in-situ may be achieved by isolating a volume of liquid in a section or length of vertically oriented pipe 18, by closing electrically actuated solenoid valve, 34, driven by controller, 36, under the direction of computer 32, whereby fluid 26 above valve 34 is static (not flowing). Oil is then acoustically separated from the water, if the fluid comprises an oil-water mixture, such that sound speed measurements can be simultaneously made in the separated oil and water. Effective separations may be achieved in less than 1 min. Although quantitative measurements have not been made, the inventors believe that less than 10 ppm of oil remains in the water, and less than 10 ppm of water remains in the oil. Such rapid separations are not possible using gravitational/buoyancy, as significant residual oil remains in the water after large wait times, thereby generating erroneous sound speeds.

As stated hereinabove, in-situ calibration requires accurate sound speed measurements for the two liquids (oil-free water and water-free oil). Oil being less dense, floats to the top of the water layer. Therefore, for sound speed measurements for water, 38, transmitting/receiving transducer pair, 40a, and, 40b, respectively, was placed below (upstream) of oil, 42, sound speed measurement transmitting/receiving transducer pair, 44a, and, 44b. Sound speed measurements for the flowing oil/water mixture may also be made either and/or both sets of these transducers, or by other transducer pairs placed along pipe 18. The center frequency of each of the transducers was 2.25 MHz (although any other frequency can be used.), and the transducers had 0.5-in diameters. The operating frequencies of the transducers may range from about 100 kHz to about 10 MHz, although the limiting practical value is about 5 MHz, since the sound absorption increases significantly in crude oil-water mixtures above that value. Therefore, for small pipe diameters, 10 MHz can be used, while for 3-6 in. diameter pipes, lower frequencies are more effective. Computer-controlled, dual-channel sound speed measurement system, 46, was used to make the measurements. Time-of-flight measurements are used because of the speed of such measurements, and acoustic pulses, tone-bursts, or frequency chirps (of various durations and frequency bandwidths) may be used. Other methods of sound speed determination may also be employed, and such measurements are not limited to those described herein. For small changes in sound speed, a phase comparison method may be used. In addition, for continuous monitoring, a feedback apparatus that locks onto and tracks a chosen resonance peak is useful.

Dual-channel measurement system 46 digitizes the received acoustic signal after it is has been transmitted through the fluid path, and transfers the data to computer 32 for processing. A DSP (digital signal processor) can also be used in place of the laptop. Real-time sound speed data are thereby obtained from the two vertically placed pairs of transducers, and the data is recorded when these measurements attain a steady value, as will be described in more detail hereinbelow. The recorded measurements are the sound speed values for the fully separated oil and water components.

If the sound speeds of the individual constituents (oil and water) are known, then the water-cut (volume fraction of water) of an oil-water mixture can be determined from equation below, which assumes that the mixture is a homogeneous fluid. The water-cut (WC) or volume fraction of water in a mixture is related to the sound speeds through a simple mixing rule as follows:

$$WC = 1 - \frac{c_o \cdot c_w (c_w - c_m)}{c_m \cdot c_w (c_w - c_o)},$$

where the $c_w$, $c_o$, and $c_m$ refer to the sound speed in water, oil, and in the mixture, respectively (See, e.g., "Comments on Hold-Up (Volume Fraction) Measurements in Liquid/Liquid Dispersions Using an Ultrasonic Technique" by Rajinder Pal, *Ind. Eng. Chem. Res.* (1994) 33, pages 744-747.). There are other, more accurate relationships between water cut and sound speed available in the literature, but the above equation works well in practice, with an accuracy ~1% in the 50% WC region, and exactly near the two extreme points (all water or all oil). It is seen that the water-cut depends on the speed of sound in water and the speed of sound in oil, such that if these values change over time, the value for the water-cut may need to be corrected by using more recent values for these speeds.

Having generally described embodiments of the present invention, the following EXAMPLE provides additional information.

Example

Figures 3, 4:
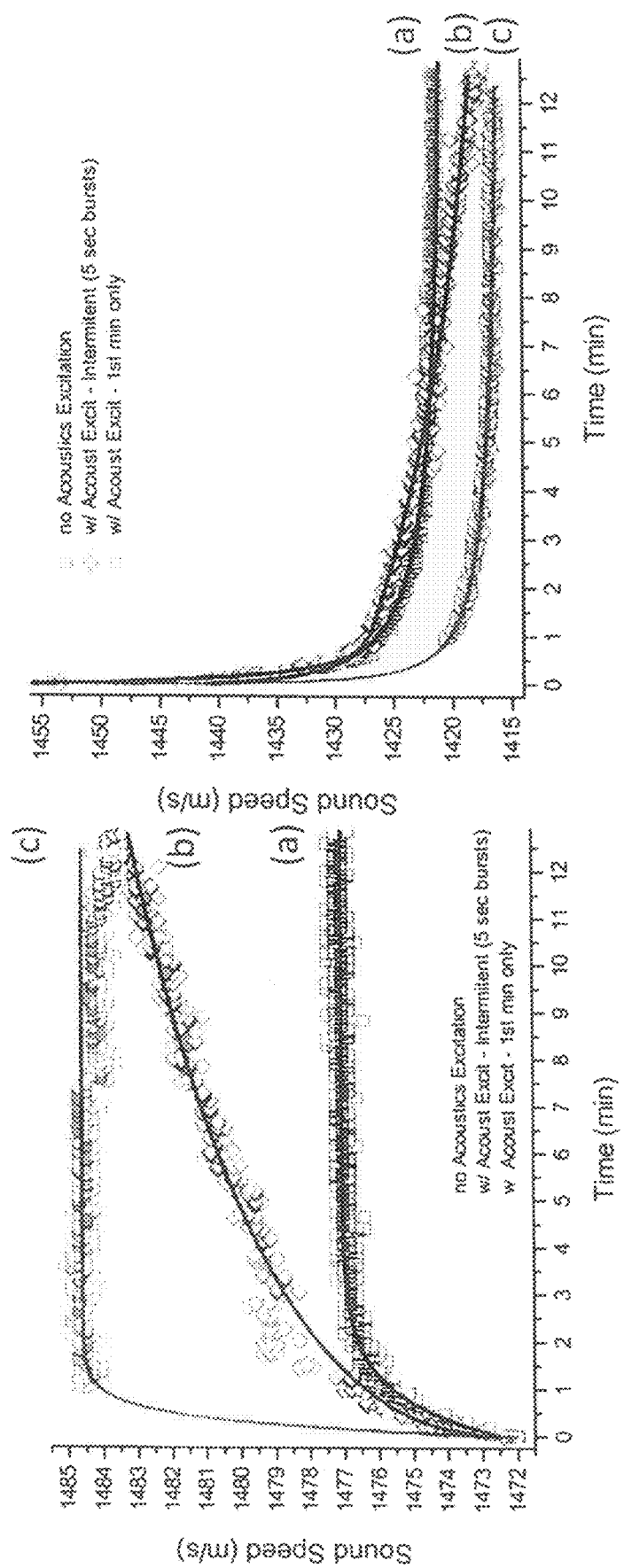
FIG. 3 is a graph of the sound speed in water as a function of time with no acoustic excitation (curve (a)), and with two acoustic separation procedures (curves (b) and (c)).
FIG. 4 is a graph of the sound speed in oil as a function of time with no acoustic excitation (curve (a)), and with two acoustic separation procedures (curves (b) and (c)).

An apparatus similar to that of FIG. 2, except that there was no oil-water flow, was tested with crude oil and process water from an oil-well mixed by inserting a mechanical stirrer into the pipe. It is expected that this procedure will simulate an oil-water mixture produced from a typical rod-pumped well, which can vary from a simple mixture to a foam-like substance in the field. Advantages of acoustic stimulated oil-water separation may be observed in FIGS. 3 and 4 hereof. FIG. 3 is a graph of the sound speed in water as a function of time with gravitational separation only and no acoustic excitation (squares, curve (a)); with intermittent acoustic stimulation ON for 5 s, OFF for 5 s. (diamonds, curve (b)); and with continuous wave (CW) acoustic stimulation (circles, curve (c), while FIG. 4 is a graph of the sound speed in oil as a function of time with gravitational separation only and no acoustic excitation (squares, curve (a)); with intermittent acoustic stimulation ON for 5 s, OFF for 5 s. (diamonds, curve (b)); and with continuous wave (CW) acoustic stimulation (circles, curve (c). Clearly, other acoustic excitation schemes can be used to optimize the separation process.

It may be observed from FIGS. 3 and 4 hereof that if only gravitational separation is used, the sound speed stabilizes (reaches saturation value) asymptotically with time, at lower values for water, and higher values for oil. When acoustic stimulation is used, by contrast, the sound speed stabilizes at a limiting value (high for water and low for oil) that is constant, as was verified with repeated measurements on the sample after mixing and then separating. If only gravitational separation is used, however, the saturated sound speed value for both oil and water does not reach the limiting values observed for acoustic separation. Acoustic stimulation clearly enhances the oil-water separation process, producing greater removal of oil from water, and greater removal of water from oil, respectively. When gravitational separation is used alone, the very small oil droplets do not rapidly separate from the water, leading to faulty calibrations. The stability of small droplets, for example in emulsions, can persist for a long time—hours, even after the bulk of the oil separates from the water. Therefore, for field applications, where the measurements must be made quickly, embodiments of the present invention provide the required separation of the mixed liquids. Once the calibration point is determined and the associated temperature is recorded, meaningful oil well monitoring can be achieved.

As stated hereinabove, conventional sampling approaches are not required for automatic, noninvasive, and in-situ optimization of oil-field operations in accordance with the teachings of embodiments of the present invention.

The most difficult separations are where the oil and water are mixed into a fine emulsion using an ultrasonic homogenizer. To visualize the process, a glass pipe was used. An emulsion with oil and water droplet sizes of less than 10 μm was prepared and observed in a sample using an optical microscope. When the acoustic field was applied, the oil is observed to collect at the nodal planes due to the acoustic radiation pressure. As will be observed in FIGS. 5 and 6 hereof, frequency modulation (~1-10 kHz) was applied so that the oil droplets moved to the nodal planes formed, and were allowed to vibrate for a period to enhance coalescence. When the sound field was turned off, the coalesced droplets being much larger than when they were initially created at the nodal planes, move to the top of the water column due to significantly larger buoyancy forces and separate. This process is quite rapid and the entire separation can take place in less than 10 s. When the oil and water are not thoroughly mixed, the separation process is yet faster as the droplets are already much larger to begin with, and the coalescing of larger droplets is energetically more favorable. Therefore, Acoustic separation can be used to separate oil-water mixtures from fine emulsions to coarse mixtures.

Figures 5A, 5B:
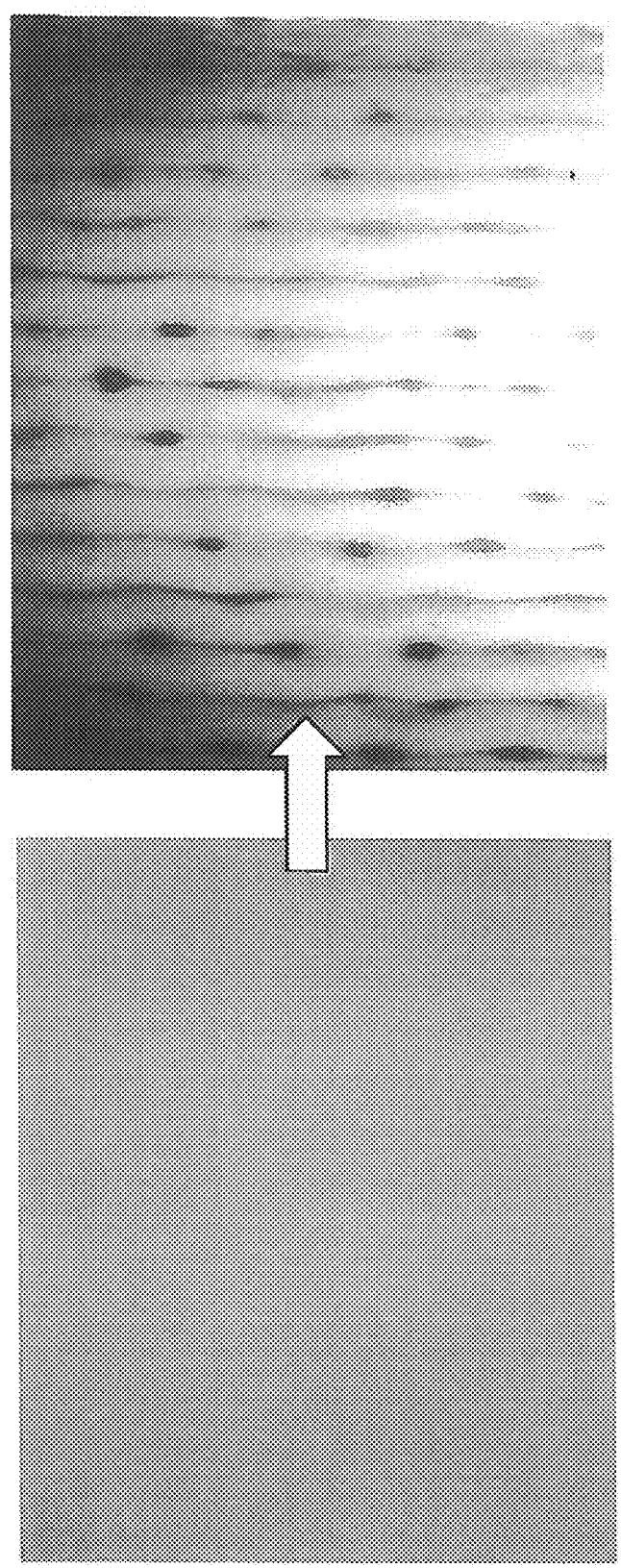

FIG. 5A is a photograph of micron-size oil droplets in an emulsion with no acoustic field present, while FIG. 5B is a photograph showing the coalescing of these droplets into millimeter-sized droplets at the acoustic standing wave patterns (nodes) generated in the liquid (1.345 MHz) when acoustic energy is applied to the fluid in an apparatus similar to that of FIG. 2 hereof. The larger the size of the droplets, the greater the buoyancy force that enhances the gravitational separation. FIG. 6A is a photograph of the further coalescing of the droplets illustrated in FIG. 5A hereof, while FIG. 6B shows the almost immediate gravitational separation resulting in the oil moving to the top of the water column when the acoustic filed is turned off.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus comprising:
a length of vertically oriented pipe, said length of vertically oriented pipe having an outer surface;
a valve disposed in a lower portion of said length of vertically oriented pipe, said valve configured in a first orientation to allow upward directional flow of the oil-water mixture through said length of vertically oriented pipe and configured in a second orientation to disallow flow of the oil-water mixture through said length of vertically oriented pipe and isolate a chosen volume of the oil-water mixture;
at least one first ultrasound transmitting transducer disposed on the outer surface of said length of pipe downstream of said valve;
a signal generator configured to, in an instance in which the valve is in the second orientation, drive said at least one first transmitting transducer with a selected frequency pattern such that an acoustic radiation force is generated having sufficient intensity such that oil droplets in the non-flowing oil-water mixture are driven toward nodal features of the acoustic radiation force, whereby an oil portion of the non-flowing oil-water mixture separates from a water portion of the non-flowing oil-water mixture;
a second ultrasonic transmitting transducer disposed on the outer surface of said length of pipe upstream or downstream from said first transmitting transducer;
a first pulse generator configured to, in an instance in which the valve is in the second orientation, provide pulsed excitation to said second ultrasonic transmitting transducer, whereby a first acoustic pulse is generated by said second ultrasonic transmitting transducer;
a first detecting transducer disposed on the surface of said length of pipe on an opposite side of said section of pipe from said second ultrasonic transmitting transducer, said first detecting transducer configured to, in an instance in which the valve is in the second orientation, receive acoustic pulses from said second ultrasonic transmitting transducer;
a first measurement apparatus configured to, in an instance in which the valve is in the second orientation, receive electrical signals from said first detecting transducer said electrical signals produced in response to receiving an acoustic pulse from said second ultrasonic transmitting transducer, whereby, in an instance in which the oil portion has separated from the water portion of the oil-water mixture, speed of sound through the water portion of the non-flowing oil-water mixture is measured from a time-of-flight of the first pulse in the separated water portion of the non-flowing oil-water mixture in said length of vertically oriented pipe;
a third ultrasonic transmitting transducer disposed on the surface of said length of pipe downstream from said second transmitting transducer;
a second pulse generator configured to, in an instance in which the valve is in the first orientation, provide pulsed excitation to said third transmitting transducer such that a second acoustic pulse is generated by said third transmitting transducer;
a second detecting transducer disposed on the surface of said length of pipe on the opposite side of said length of pipe from said third transmitting transducer, said second detecting transducer configured to, in an instance in which the valve is in the first orientation, receive acoustic pulses from said third transmitting transducer; and
a second measurement apparatus configured to, in an instance in which the valve is in the first orientation, receive electrical signals from said second detecting transducer produced in response to receiving an acoustic pulse from said third transmitting transducer,
whereby the speed of sound through the flowing oil-water mixture is measured, in an instance in which the valve is in the first orientation, from the time-of-flight of the second acoustic pulse through the flowing oil-water mixture in said length of vertically oriented pipe.

2. The apparatus of claim 1, wherein said at least one first ultrasound transmitting transducer comprises a piezoelectric transducer.

3. The apparatus of claim 1, wherein the selected frequency pattern is chosen from a sine wave and a tone burst.

4. A method comprising:
in an instance in which a valve of a vertically oriented section of pipe is open, thereby allowing the oil-water mixture to flow in an upward direction through the vertically oriented section of pipe, measuring time-of-flight of an acoustic pulse through the oil-water mixture;
after measuring the time-of-flight of said acoustic pulse through the oil-water mixture as it flows in the upward direction through the vertically oriented section of pipe, closing the valve to stop the oil-water mixture from flowing through the vertically oriented section of pipe, thereby retaining a selected volume of non-flowing oil-water mixture within said vertically oriented section of pipe;
transmitting an acoustic standing wave pattern through the selected volume of non-flowing oil-water mixture retained in the vertically oriented section of pipe, the transmitted acoustic standing wave pattern having an intensity sufficient to move droplets of oil to nodes of an acoustic radiation force generated in the selected volume of non-flowing oil-water mixture such that an oil portion of the oil-water mixture is separated from a water portion of the selected volume of non-flowing oil-water mixture;
once the oil portion is separated from the water portion, directing a first ultrasonic pulse through the water portion at a first position on the vertically oriented section of pipe, and measuring the time-of-flight of the first acoustic pulse through the water portion to determine a speed of sound through the water portion; and
once the oil portion is separated from the water portion, directing a second ultrasonic pulse through the oil portion at a second position downstream from the first position, and measuring the time-of-flight of the second acoustic pulse to determine the speed of sound through the oil portion.

5. The method of claim 4, wherein said measurements of the time-of-flight of the acoustic pulses are performed in situ.

6. The method of claim 4, further comprising:
determining a volume fraction of water in the oil-water mixture based upon a comparison of at least the time-of-flight of the acoustic pulse in the flowing oil-water mixture, the speed of sound through the water within the selected volume of non-flowing oil-water mixture, and the speed of sound through the oil within the selected volume of non-flowing oil-water mixture, wherein a speed of sound in the oil-water mixture is determined from the time-of-flight of the acoustic pulse therethrough.

7. The method of claim 6, wherein said determining the volume fraction of water (WC) in the oil-water mixture is determining according to the following equation:

$$WC = 1 - \frac{C_o \cdot C_w(C_w - C_m)}{C_m \cdot C_w(C_w - C_o)}$$

wherein $C_w$, $C_o$, and $C_m$ refer, respectively, to the speed of sound in water, the speed of sound in oil, and the speed of sound in the oil-water mixture.

8. An apparatus comprising:
a length of vertically oriented pipe, said length of vertically oriented pipe having an outer surface;
a valve disposed in a lower portion of said length of vertically oriented pipe, said valve configured in a first orientation to allow upward directional flow of the oil-water mixture through said length of vertically oriented pipe and configured in a second orientation to disallow flow of the oil-water mixture through said length of vertically oriented pipe and isolate a chosen volume of the oil-water mixture;
at least one first ultrasound transmitting transducer disposed on the outer surface of said length of pipe downstream of said valve;
a signal generator configured to, in an instance in which the valve is in the second orientation, drive said at least one first transmitting transducer with a selected frequency pattern such that an acoustic radiation force is generated having sufficient intensity such that oil droplets in the non-flowing oil-water mixture are driven toward nodal features of the acoustic radiation force, whereby an oil portion of the non-flowing oil-water mixture separates from a water portion of the non-flowing oil-water mixture;
a second ultrasonic transmitting transducer disposed on the outer surface of said length of pipe upstream or downstream from said first transmitting transducer;
a first pulse generator configured to, in an instance in which the valve is in the second orientation, provide pulsed excitation to said second ultrasonic transmitting transducer, whereby a first acoustic pulse is generated by said second ultrasonic transmitting transducer;
a first detecting transducer disposed on the surface of said length of pipe on an opposite side of said section of pipe from said second ultrasonic transmitting transducer, said first detecting transducer configured to, in an instance in which the valve is in the second orientation, receive acoustic pulses from said second ultrasonic transmitting transducer; and
a first measurement apparatus, wherein in response to the first detecting transducer receiving said acoustic pulses from said second transmitting transducer, the first detecting transducer is configured to send electrical signals to said first measurement apparatus,
whereby, in an instance in which the valve is in the second configuration and the oil portion of the oil-water mixture is separated from the water portion of the oil-water mixture, speed of sound through the water portion is measured from a time-of-flight of the first pulse through the separated water portion of the chosen volume of non-flowing oil-water mixture or the speed of sound through the oil portion is measured from the time-of-flight of the first pulse through the oil portion of the chosen volume of the non-flowing oil-water mixture in said length of vertically oriented pipe.

9. The apparatus of claim 8, wherein said at least one first ultrasound transmitting transducer comprises a piezoelectric transducer.

10. The apparatus of claim 8, wherein the selected frequency pattern is chosen from a sine wave and a tone burst.

11. A method comprising:
in an instance in which a valve of a vertically oriented section of pipe is open, thereby allowing the oil-water mixture to flow in an upward direction therethrough, measuring time-of-flight of an acoustic pulse through the oil-water mixture;
after measuring the time-of-flight of said acoustic pulse through the flowing oil-water mixture, closing the valve to stop the oil-water mixture from flowing through the vertically oriented section of pipe, thereby retaining a selected volume of non-flowing oil-water mixture within said vertically oriented section of pipe;
transmitting an acoustic standing wave pattern through the selected volume of non-flowing oil-water mixture retained in the vertically oriented section of pipe, the transmitted acoustic standing wave pattern having an intensity sufficient to move droplets of oil to nodes of an acoustic radiation force generated in the selected volume of non-flowing oil-water mixture such that an oil portion of the non-flowing oil-water mixture is separated from a water portion of the non-flowing oil-water mixture;
once the oil portion of the selected volume of non-flowing oil-water mixture is separated from the water portion of the selected volume of non-flowing oil-water mixture, directing a first ultrasonic pulse through the water portion at a first position on the vertically oriented section of pipe, and measuring the time-of-flight of the first acoustic pulse through the water portion to determine the speed of sound through the water portion.

12. The method of claim 11, wherein said measurements of the time-of-flight of the acoustic pulses are performed in situ.

13. The method of claim 11, further comprising:
determining a volume fraction of water in the oil-water mixture based upon a comparison of at least the time-of-flight of the acoustic pulse in the flowing oil-water mixture and the speed of sound through the water within the selected volume of non-flowing oil-water mixture, wherein a speed of sound in the oil-water mixture is determined from the time-of-flight of the acoustic pulse therethrough.

14. The method of claim 13, wherein said determining the volume fraction of water (WC) in the oil-water mixture is determining according to the following equation:

$$WC = 1 - \frac{C_o \cdot C_w(C_w - C_m)}{C_m \cdot C_w(C_w - C_o)}$$

wherein $C_w$, $C_o$, and $C_m$ refer, respectively, to the speed of sound in water, the speed of sound in oil, and the speed of sound in the oil-water mixture.

15. An apparatus comprising:
a length of vertically oriented pipe, said length of vertically oriented pipe having an outer surface;
a valve disposed in a lower portion of said length of vertically oriented pipe, said valve configured in a first orientation to allow upward flow of the oil-water mixture through said length of vertically oriented pipe and configured in a second orientation to disallow the flow of the oil-water mixture through said length of vertically oriented pipe to isolate a chosen volume of the oil-water mixture;

at least one first ultrasound transmitting transducer disposed on the outer surface of said length of pipe downstream of said valve;

a signal generator configured to, in an instance in which the valve is in the second orientation, drive said at least one first transmitting transducer with a selected frequency pattern such that an acoustic radiation force is generated having sufficient intensity such that oil droplets in the chosen volume of the non-flowing oil-water mixture are driven toward nodal features of the acoustic radiation force, whereby an oil portion of the chosen volume of non-flowing oil-water mixture separates from a water portion of the chosen volume of non-flowing oil-water mixture;

a second ultrasonic transmitting transducer disposed on the outer surface of said length of pipe downstream from said first transmitting transducer;

a first pulse generator configured to, in an instance in which the valve is in the second configuration, provide pulsed excitation to said second transmitting transducer, whereby a first acoustic pulse is generated by said second transmitting transducer;

a first detecting transducer disposed on the surface of said length of pipe on an opposite side of said length of pipe from said second transmitting transducer, said first detecting transducer configured to, in an instance in which the valve is in the second configuration, receive acoustic pulses from said second transmitting transducer; and a first measurement apparatus configured to, in an instance in which the valve is in the second configuration, receive electrical signals from said first detecting transducer, said electrical signals produced in response to receiving an acoustic pulse from said second transmitting transducer, whereby, in an instance in which the valve is in the second configuration, speed of sound of the water portion is measured from a time-of-flight of the first pulse through the water portion of the chosen volume of non-flowing oil-water mixture in said length of vertically oriented pipe, or the speed of sound of the oil portion is measured from the time-of-flight of the first pulse through the oil portion of the chosen volume of non-flowing oil-water mixture in said length of vertically oriented pipe.

16. The apparatus of claim 15, wherein said at least one first ultrasound transmitting transducer comprises a piezoelectric transducer.

17. The apparatus of claim 15, wherein the selected frequency pattern is chosen from a sine wave and a tone burst.

18. A method comprising:

in an instance in which a valve of a vertically oriented section of pipe is open, thereby allowing the oil-water mixture to flow in an upward direction through the vertically oriented section of pipe, measuring time-of-flight of an acoustic pulse through an oil-water mixture, the oil-water mixture flowing in an upward direction through a vertically oriented section of pipe;

closing a valve within the vertically oriented section of pipe to isolate a non-flowing volume of the oil-water mixture;

transmitting an acoustic standing wave pattern through the non-flowing volume of the oil-water mixture, the acoustic standing wave pattern having sufficient intensity that oil droplets in the non-flowing volume of the oil-water mixture are moved to nodes thereof by an acoustic radiation force produced by the acoustic standing wave pattern, thereby forming a water portion separated in the vertically oriented section of pipe from an oil portion;

directing an ultrasonic pulse through the water portion; and measuring the time of flight of the ultrasonic pulse through the water portion, whereby the speed of sound in the water portion is determined.

19. The method of claim 18, wherein said measurements of the time-of-flight of the acoustic pulse and the ultrasonic pulse are performed in situ.

20. The method of claim 18, further comprising:

determining a volume fraction of water in the oil-water mixture based upon a comparison of at least the time-of-flight of the acoustic pulse in the flowing oil-water mixture and the time-of-flight of the ultrasonic pulse through the water portion of the non-flowing volume of the oil-water mixture, wherein a speed of sound in a fluid or fluid mixture is determined from the time-of-flight of the acoustic pulse or the ultrasonic pulse therethrough.

21. The method of claim 20, wherein said determining the volume fraction of water (WC) in the oil-water mixture is determining according to the following equation:

$$WC = 1 - \frac{C_o \cdot C_w(C_w - C_m)}{C_m \cdot C_w(C_w - C_o)}$$

wherein $C_w$, $C_o$, and $C_m$ refer, respectively, to the speed of sound in water, the speed of sound in oil, and the speed of sound in the oil-water mixture.

* * * * *